United States Patent [19]

Tsuchiya et al.

[11] Patent Number: 5,067,038
[45] Date of Patent: Nov. 19, 1991

[54] ROTARY MAGNETIC HEAD DEVICE HAVING TWO DIFFERENT KINDS OF HEADS

[75] Inventors: Toshio Tsuchiya; Mitsuo Abe, both of Kanagawa; Nobuo Arai, Tokyo; Masumi Hisatomi, Kanagawa; Hideo Zama, Ibaraki, all of Japan

[73] Assignee: Hitachi, Ltd., Tokyo, Japan

[21] Appl. No.: 548,628

[22] Filed: Jul. 5, 1990

[30] Foreign Application Priority Data

Jul. 5, 1989 [JP] Japan .................. 1-171784

[51] Int. Cl.[5] .................. G11B 5/52; G11B 5/027; G11B 15/60
[52] U.S. Cl. .................. 360/107; 360/130.24; 360/85; 360/95; 360/121
[58] Field of Search .................. 360/84, 124, 130.22, 360/130.23, 130.24, 121, 81, 85, 95, 107

[56] References Cited

U.S. PATENT DOCUMENTS

| | | | |
|---|---|---|---|
| 4,525,753 | 6/1985 | Shimeki et al. | 360/46 |
| 4,575,777 | 3/1986 | Hosokawa | 360/110 |
| 4,631,612 | 12/1986 | Shiiki et al. | 360/122 |
| 4,710,837 | 12/1987 | Matsumoto | 360/130.3 |
| 4,719,528 | 1/1988 | Sato | 360/130.24 |
| 4,796,126 | 1/1989 | Tsuchiya et al. | 360/122 |
| 4,799,118 | 1/1989 | Yamada et al. | 360/125 X |
| 4,862,304 | 8/1989 | Yunoki et al. | 360/128 |
| 4,893,200 | 1/1990 | Yunoki et al. | 360/67 |
| 4,896,220 | 1/1990 | Sato et al. | 360/21 |

FOREIGN PATENT DOCUMENTS

| | | | |
|---|---|---|---|
| 61-117721 | 6/1986 | Japan . | |
| 63-276705 | 11/1988 | Japan . | |
| 63-311615 | 12/1988 | Japan . | |
| 02-44503 | 2/1990 | Japan | 360/130.24 |

OTHER PUBLICATIONS

Consumer Products Research Center, Hitachi Ltd., MR89-41, Dec. 19, 1989, pp. 9-15, "Properties of Thin Film Video Head" by T. Tsuchiya et al.

Primary Examiner—David J. Severin
Assistant Examiner—Alfonso Garcia
Attorney, Agent, or Firm—Antonelli, Terry, Stout & Kraus

[57] ABSTRACT

A rotary magnetic head device utilizes a thin film magnetic head or heads having small mutual influence to external magnetic field in combination with a bulk magnetic head or heads to reduce crosstalk between recording head and reproducing head to thereby improve S/N ratio.

7 Claims, 3 Drawing Sheets

FIG. 1
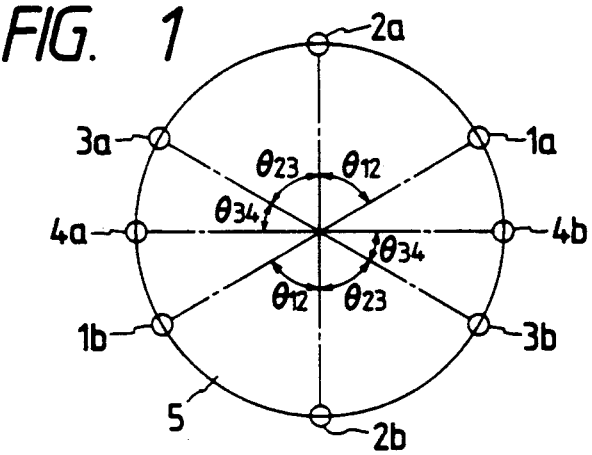
FIG. 2
| | RECORDING HEAD (1a, 1b) | REPRODUCING HEAD (2a, 2b) | CROSSTALK FRM RECORDING HEAD TO REPRODUCING HEAD |
|---|---|---|---|
| HEAD COMBINATION NO. 0 | BULK HEAD | BULK HEAD | 0 dB (REFERENCE) |
| HEAD COMBINATION NO. 1 | BULK HEAD | THIN FILM HEAD | -12 to -15 dB |
| HEAD COMBINATION NO. 2 | THIN FILM HEAD | BULK HEAD | -8 to -10 dB |
| HEAD COMBINATION NO. 3 | THIN FILM HEAD | THIN FILM HEAD | -6 to -8 dB |
FIG. 3
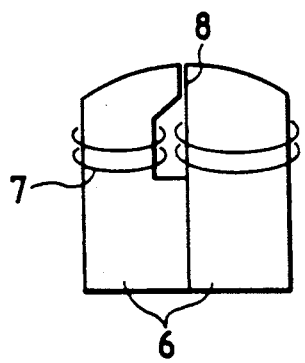
FIG. 4
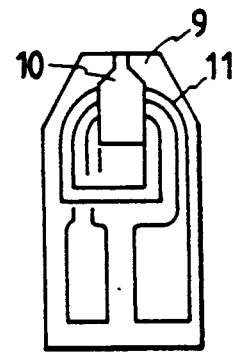

FIG. 7
| | OPERATION MODE OF THIN FILM MAGNETIC HEAD | OPERATION MODE OF BULK MAGNETIC HEAD |
|---|---|---|
| OPERATION MODE 1 | REPRODUCTION | RECORDING |
| OPERATION MODE 2 | RECORDING | REPRODUCTION |
| OPERATION MODE 3 | RECORDING | RECORDING |
| OPERATION MODE 4 | ERASE | RECORDING |
| OPERATION MODE 5 | RECORDING | ERASE |
| OPERATION MODE 6 | ERASE | REPRODUCTION |
| OPERATION MODE 7 | REPRODUCTION | ERASE |
FIG. 8
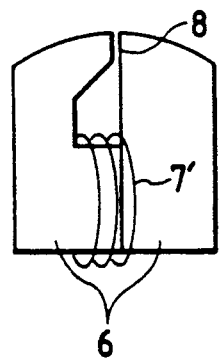
FIG. 9
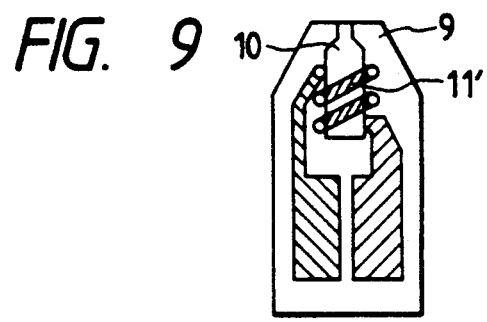

ROTARY MAGNETIC HEAD DEVICE HAVING TWO DIFFERENT KINDS OF HEADS

BACKGROUND OF THE INVENTION AND RELATED ART STATEMENT

The present invention relates to a magnetic recording/reproducing device for recording/reproducing information on a magnetic tape by means of a helical scan system and, more particularly, to a helical scan type rotary magnetic head device having magnetic heads operating in different manners, simultaneously.

In a conventional VTR of the helical scan type, there is a three-head system and a four-head system which include a head or two heads for special reproduction added, respectively, to a standard two-head system in which a pair of magnetic heads are arranged around a rotary cylinder with 180° interval and a magnetic tape runs around the rotary cylinder with a winding angle of 180° or more so that the magnetic heads scan the magnetic tape obliquely with respect to the longitudinal direction thereof to record on or reproduce from the tape a video signal. It is usual in either the three-head or the four-head system that either a recording operation or a reproducing operation is selected.

As another conventional system which can operate to record and reproduce information such as a video image simultaneously, Japanese Kokai (Patent) No. 61-117721 discloses a pair of recording heads and a pair of reproducing heads arranged independently from each other.

In the latter conventional technique, there is a disadvantage that magnetic flux produced in the recording head by a recording signal is leaked into the reproducing head when a signal recording and a signal reproduction are performed simultaneously, causing a crosstalk to occur in a reproduced signal by which the S/N ratio of the reproduced signal is lowered.

OBJECT AND SUMMARY OF THE INVENTION

An object of the present invention is to provide a rotary magnetic head device having two kinds of heads to be operated in different manners simultaneously, in which crosstalk between the heads due to leakage of undesired magnetic flux of a first kind of head to a second kind of head is reduced, so that a magnetic recording/reproducing can be performed with high S/N ratio.

The above object can be achieved, according to the present invention, by a combination of at least one thin film magnetic head having spatially minimized magnetic core and minimum mutual effect with respect to an external magnetic field and at least one bulk head.

In the present invention, the thin film magnetic head formed on a non-magnetic substrate has a minimized magnetic path length, a minimized spatial factor in the magnetic core and a minimum mutual magnetic effect with respect to an external magnetic field. Therefore, flux leakage from other heads passing through the thin film magnetic head is minimized and, thus, crosstalk introduced into the thin film magnetic head is minimized. Further, since the direction of magnetic leakage from the thin film magnetic head is substantially perpendicular to the direction of a coil of a bulk head, a component of crosstalk introduced to the bulk head becomes minimum. Therefore, it is possible to reduce cross talk due to leakage of undesired magnetic flux produced in one head or heads into the other head or heads, all of which are operated simultaneously, and, thus, it is possible to record and reproduce signals with a sufficiently high S/N ratio.

BRIEF DESCRIPTION OF THE DRAWINGS

FIG. 1 shows a magnetic head arrangement according to the present invention, schematically;

FIG. 2 is a table showing crosstalk between a recording head and a reproducing head combined in various ways;

FIG. 3 is a plan view of a bulk head;

FIG. 4 is a plan view of a thin film magnetic head when viewed from a plane thereof on which a thin film is formed;

FIG. 7 is an illustration for understanding an operation mode of the thin film magnetic head and the bulk head in the respective embodiments;

FIG. 8 shows another example of the bulk head; and

FIG. 9 shows another example of the thin film magnetic head.

DETAILED DESCRIPTION OF THE PREFERRED EMBODIMENTS

Figure 5A:
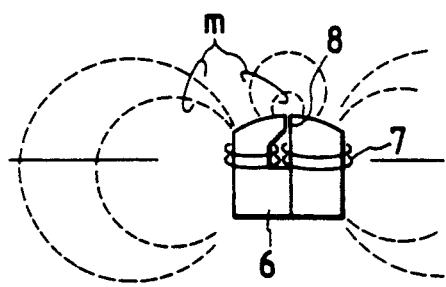
FIGS. 5a and 5b and FIGS. 5c and 5d illustrate the distribution of magnetic lines of force from a bulk type head and a thin film magnetic head in the vicinity of a recording head and those on a rotary cylinder, respectively.

Embodiments of the present invention will be described with reference to the accompanying drawings.

FIG. 1 shows an embodiment of a head arrangement of a rotary magnetic head device according to the present invention when applied to a VHS type video tape recorder (VTR), in which magnetic heads 1a, 1b, 2a, 2b, 3a, 3b, 4a and 4b are arranged on a peripheral surface of a cylinder 5. The magnetic heads 1a and 1b are recording heads arranged along the periphery of the cylinder with an interval of 180° for a standard operation mode and a long time operation mode, respectively. The magnetic heads 1a and 1b are of double azimuth type suitable for a special reproduction.

The magnetic heads 2a and 2b are reproduction heads arranged in angular positions of $\theta_{12}$ with respect to the heads 1a and 1b, respectively, and are of double azimuth type. The reproduction heads 2a and 2b are used together with the magnetic heads 1a and 1b when both recording and reproducing operations are to be performed simultaneously. That is, since tracks of a magnetic tape on which signals are recorded by the recording heads 1a and 1b pass relatively over the magnetic heads 2a and 2b when the rotary cylinder rotates by an angle of $\theta_{12}$, the signal can be reproduced by the magnetic heads 2a and 2b while the magnetic heads 1a and 1b are recording. Further, it is clear for those skilled in the art that such signals may be reproduced by the magnetic heads 1a and 1b at a later time.

The magnetic heads 3a and 3b are heads for a Hi-Fi audio signal and are arranged at positions $\theta_{23}$ from the magnetic heads 2a and 2b, respectively.

The magnetic heads 4a and 4b are erasing heads and are arranged at positions $\theta_{34}$ from the magnetic heads 3a and 3b, respectively.

$\theta_{12}$, $\theta_{23}$ and $\theta_{34}$ are to be selected such that a contact of one head pair with the tape does not affect a contact of another head pair with the tape. In this embodiment, $\theta_{12}$, $\theta_{23}$ and $\theta_{34}$ are set to 60°, 60° and 30°, respectively.

Heights of the magnetic heads 1a, 2a, 3a and 4a and heights of the magnetic heads 1b, 2b, 3b and 4b on the cylinder are regulated such that these magnetic heads run over the predetermined track of the magnetic tape, respectively.

FIG. 2 is a table showing combinations of heads having different constructions as the recording heads 1a and 1b and the reproducing heads 2a and 2b, together with crosstalk with the head combination No. 0 corresponding to a conventional combination being used as a reference.

In a first embodiment of the present invention in which a combination No. 1 is used, each of the recording heads 1a and 1b is a conventional bulk type head having a magnetic path constituted with a bulk magnetic core 6 whose size is about $2\times2\times0.1$ mm$^3$ and on which a coil 7 is wound, as shown in FIG. 3.

Each of the reproducing magnetic heads 2a and 2b comprises a thin film magnetic head composed of a non-magnetic substrate 9, a lower thin film magnetic core formed thereon, an insulating layer formed on the lower thin film magnetic core, a thin film coil 11 formed on the insulating layer and an upper thin film magnetic core 10 formed on the coil 11 and shaped to a predetermined configuration, as shown in FIG. 4. Since the construction of such thin film magnetic head is known, details thereof are omitted. In this embodiment, the three dimensional size of the upper core 10 is about $0.2\times0.02\times0.1$ mm$^3$.

During signal recording, a current which may be about 1000 times that for reproduction flows through the coils 7 of the recording heads 1a and 1b. Therefore, flux leakage from the recording heads 1a and 1b is relatively large, which may produce crosstalk in the reproducing heads 2a and 2b if the reproducing heads 2a and 2b were of the bulk type. According to the present invention in which the reproducing heads 2a and 2b take in the form of the thin film magnetic heads, a solid angle of the magnetic core of the reproducing head 2a or 2b is in the order of one tenth of the case of the conventional bulk type head since the spatial expansion of the magnetic core of the thin film magnetic head is small, so that flux leakage from the recording head 1a to the reproducing head 2a is reduced considerably. This effect will be referred to as "magnetic core minimization effect" hereinafter.

Figure 5B:
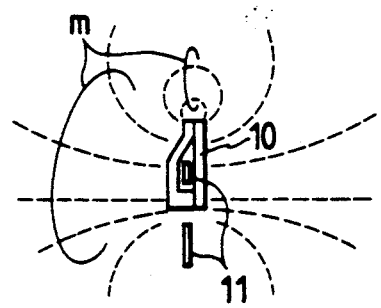
Figure 5C:
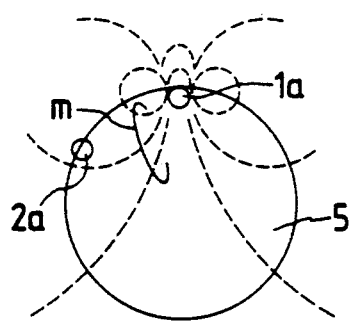
Figure 5D:
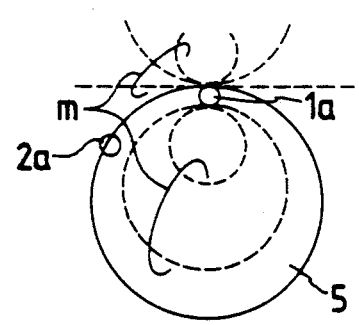

FIGS. 5a and 5b illustrate distributions of magnetic lines of force m in the vicinity of the recording head 1a, produced by the bulk type head and the thin film magnetic head, respectively, and FIGS. 5c and 5d illustrate distributions thereof on the cylinder, respectively.

As shown in FIG. 5a, it is usual for the bulk type head to wind the coil 7 as shown in view of improvements of recording and reproducing efficiencies and, since leakage of recording magnetic field is mainly perpendicular to a plane in which a signal coil is formed, leakage flux extends substantially along the periphery of the rotary cylinder in the vicinity of a magnetic gap 8. However, on the side of a side surface of the head, its component perpendicular to the rotary cylinder becomes large, as shown in FIGS. 5a and 5c.

Figure 6A:
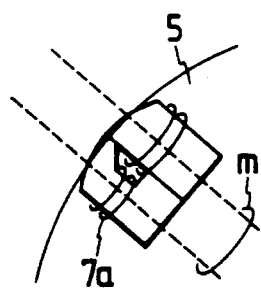
FIGS. 6a to 6d illustrate the reproducing head combined with the recording head in various combinations and crosstalk magnetic lines of force.
Figure 6B:
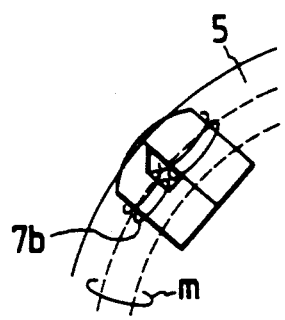
Figure 6C:
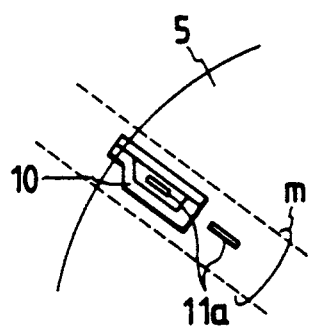
Figure 6D:
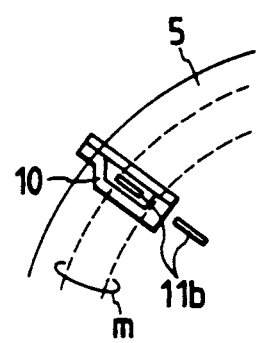

FIGS. 6a and 6b show distributions of magnetic lines of force around the bulk type reproducing heads in the respective combination Nos. 0 and 2 shown in FIG. 2, respectively, and FIGS. 6c and 6d show those around the thin film magnetic reproducing heads in the respective combination Nos. 1 and 3.

The first embodiment of the present invention corresponds to the case having the distribution shown in FIG. 6c in which a component of magnetic lines of force which passes through the reproducing coil 11a is reduced compared with that passing through the coil 7a shown in FIG. 6a corresponding to the conventional construction and thus crosstalk induced in the reproducing coil 11a is reduced. This effect will be referred to as "coil orientation effect" hereinafter.

As shown in FIG. 2, the first embodiment having the head combination No. 1 provides crosstalk which is smaller than that in the conventional head combination No. 0 by 12 dB or more. Therefore, magnetic flux leakage from the recording head to the reproducing head can be reduced to one fourth or less.

A second embodiment of the present invention which corresponds to the head construction No. 2 in FIG. 2 includes recording magnetic heads 1a and 1b comprising thin film magnetic heads each formed on a non-magnetic substrate and reproducing heads 2a and 2b of conventional bulk type.

In the second embodiment, flux leakage from the thin film recording heads 1a and 1b distributes in a circumferential direction of the rotary cylinder as shown in FIGS. 5b and 5d. In the vicinity of the reproducing head 2a or 2b, a magnetic field component thereof which passes through a signal coil 7b of the reproducing head 2b is reduced by the coil orientation effect and therefore the flux leakage into the reproducing coil 7a can be reduced by about 8 dB. With the thin film magnetic recording heads 1a and 1b, a problem of recordation on a magnetic tape of a video signal including cross-modulation distortion caused by introduction into a video signal recording head of undesired signal from other heads which are recording an audio signal and/or the rotary erasing heads 4a and 4b is substantially solved.

On the other hand, in a third embodiment of the present invention employing the head combination No. 3, recording heads 1a and 1b as well as reproducing heads 2a and 2b take the form of thin film magnetic formed on a non-magnetic substrate. In the third embodiment, the coil orientation effect tends to increase crosstalk as shown in FIG. 6d. However, since the magnetic core minimization effect is large, crosstalk can be reduced totally by about 6 dB.

From the above description, it is clear that the thin film magnetic heads and the bulk type magnetic heads in such combination as combination No. 1 or 2, can provide a reduction of crosstalk by an amount larger than by about 2 to 6 dB compared with the head combination No. 3.

Although the present invention has been described as applied to a VHS type VTR, it can be applied to other head constructions having no magnetic heads 3a and 3b, no heads 4a and 4b or no heads 3a, 3b, 4a and 4b, or to such construction in which the magnetic heads 1a, 1b, 2a and 2b are single azimuth heads, or to a magnetic recording and reproducing device having other rotary magnetic heads, with substantially the same effect.

In the present invention, the previously mentioned effect is not obtained due to the kind of signal information such as video signal or audio signal, but is obtained as a result the operation mode of the thin film magnetic heads and the bulk type heads. Therefore, the described embodiments can be classified according to the operation mode of the thin film magnetic head and the bulk type magnetic head. This will be described with reference to FIG. 7.

In FIG. 7, operation modes 1 and 2 correspond to the first and the second embodiments, respectively.

An operation mode 3 corresponds to a fourth embodiment of the present invention in which the thin film magnetic heads and the bulk type magnetic heads are used in a recording mode. In this case, the thin film magnetic heads and the bulk type magnetic heads record different signals, such as audio signal and video signal, respectively. In this mode, the recording on a magnetic tape of a signal including cross-modulation distortion due to crosstalk from other recording heads is reduced by about 8 dB.

An operation mode 4 corresponds to a fifth embodiment of the present invention in which the thin film magnetic heads are used in an erase mode and the bulk type heads are used in recording. In this embodiment, the possibility of recording on a magnetic tape of a signal including cross modulation distortion due to crosstalk from the erase heads to the recording heads is reduced by about 8 dB.

An operation mode 5 corresponds to a sixth embodiment of the present invention in which the thin film magnetic heads are used in a recording mode and the bulk type magnetic heads are used in an erase mode. The reduction of the same possibility as that in the fifth embodiment is about 10 dB.

An operation mode 6 corresponds to a seventh embodiment of the present invention in which the thin film magnetic heads are used in an erase mode and the bulk type magnetic heads are used in a reproduction mode. In this embodiment, the crosstalk from the erase heads to the reproduction heads is reduced by 8 dB.

An operation mode 7 corresponds to an eighth embodiment in which the thin film magnetic heads are used in a reproduction mode and the bulk type magnetic heads are used in an erase mode. In this embodiment, the same effect as that obtained in the seventh embodiment is obtained with reduction of about 12 dB.

Although the thin film magnetic head has been described as having a thin film coil 11 formed spirally on a plane parallel with a plane in which the magnetic gap is formed, another coil configuration, such as a helical coil shown in FIG. 9, can be used with the head combination No. 0. In such case, crosstalk is reduced due to the magnetic core minimization effect. However, since it is impossible to expect the coil orientation effect, the reduction of cross talk may be smaller than that in the spiral coil configuration.

This small reduction of crosstalk may be improved by orienting the coil 7' of the bulk type magnetic head provided in the vicinity of a rear junction portion of the bulk core, as shown in FIG. 8, perpendicularly to that shown in FIG. 3, so that the coil orientation effect is obtained, resulting in the same crosstalk reduction as in the case of a spiral coil.

According to the present invention, crosstalk between magnetic heads operating in one mode and magnetic heads operating at the same time in another mode can be reduced considerably and, thus, magnetic recording/reproduction is possible with a high S/N ratio.

What is claimed is:

1. A helical scan type rotary magnetic head device comprising a rotary cylinder on which a magnetic tape is to be wound and magnetic head means mounted on and carried by said rotary cylinder, said magnetic head means being adapted to scan said magnetic tape in a slated direction with respect to a longitudinal direction of said tape, said magnetic head means including at least one thin film magnetic head composed of a non-magnetic substrate, a thin film magnetic core formed on said non-magnetic substrate and a thin film signal coil formed on said non-magnetic substrate, and at least one bulk type magnetic head composed of a bulk magnetic core and a signal coil wound on said bulk magnetic core.

2. The device claimed in claim 1, wherein said magnetic head means includes at least one recording a magnetic head for recording signal on said magnetic tape and at least one reproduction magnetic head for reproducing the signal from said magnetic tape, either one of said recording magnetic head and said reproduction magnetic head being said thin film magnetic head and the other magnetic head being said bulk magnetic head.

3. The device claimed in claim 1, wherein said magnetic head means includes at least one recording magnetic head for recording a signal on said magnetic tape and at least one erasing magnetic head for erasing the signal recorded on said magnetic tape, either one of said recording magnetic head and said erasing magnetic head being said thin film magnetic head and the other magnetic head being said bulk magnetic head.

4. The device claimed in claim 1, wherein said magnetic head means includes two different kinds of magnetic heads for recording a signal on said magnetic tape simultaneously, either one of one kind of said recording magnetic head and the other kind of said recording magnetic head being said thin film magnetic head and the other recording magnetic head being said bulk magnetic heads 5. The device claimed in claim 1, wherein said magnetic head means includes at least one erasing magnetic head for erasing a signal recorded on said magnetic tape and at least one reproduction magnetic head for reproducing the signal recorded on said magnetic tape, either one of said reproducing magnetic head and said erasing magnetic head being, said thin film magnetic head and the other magnetic head being said bulk magnetic head.

6. The device claimed in claim 1, wherein said thin film magnetic head includes a spiral coil formed such that said spiral coil produces a magnetic field in a substantially tangential direction to a magnetic gap surface.

7. The device claimed in claim 1, wherein said thin film magnetic head includes a helical coil formed such that said coil produces a magnetic field in a substantially parallel direction to a magnetic gap surface.

* * * * *